Jan. 6, 1953

A. W. ROUND 2,624,147

NONTWISTING FISH LURE AND SPOON

Filed June 27, 1951

INVENTOR.
ALBERT W. ROUND
BY
H. G. Manning
ATTORNEY

Patented Jan. 6, 1953

2,624,147

UNITED STATES PATENT OFFICE

2,624,147

NONTWISTING FISH LURE AND SPOON

Albert W. Round, Torrington, Conn.

Application June 27, 1951, Serial No. 233,830

1 Claim. (Cl. 43—42.5)

This invention relates to fish lures and spoons and more particularly to a combination fish lure and spoon for use by amateur and commercial fishermen in spinning, bait casting, fly casting, and trolling.

One object of this invention is to provide a lure of the character described which will simulate a live swimming minnow or shiner in appearance and motion.

Another object of this invention is to provide a lure which will, by virtue of its shape and erratic undulatory motions through the water, be attractive and tantalizing to all kinds of game fish.

A further object is to provide a lure which will wobble but will have no tendency to rotate about its longitudinal axis when moved through the water.

A further object is to provide a lure which will reflect moving beams of light from a plurality of planar surfaces so as to be highly attractive to fish even at remote distances.

A further object is to provide a device of the above nature which will be simple in construction, inexpensive to manufacture, easy to install, ornamental in appearance, and very efficient and durable in use.

With these and other objects in view there has been illustrated on the accompanying drawing one form in which the invention may conveniently be embodied in practice.

Figure 1:
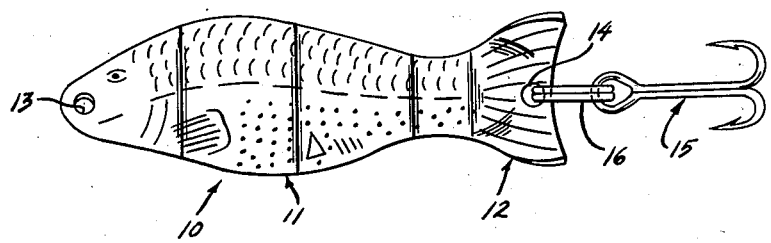
Fig. 1 represents a side view of the improved fish lure.

Referring now to the drawing, in which like reference numerals denote corresponding parts throughout the several views, the numeral 10 designates generally the improved fish lure, which is formed of bright nickel, shiny sheet brass, or other material, and comprises the body portion 11, and an integral tail portion 12. The body and tail are preferably formed of sheet material and marked on one side to simulate the appearance of a small fish bait such as a minnow.

At the forward or nose end of the lure 10, there is provided a small opening 13 for attachment of the fish line leader (not shown). The tail portion 12 is also provided with a small centrally located opening 14, whereby a fish hook 15 may be loosely linked to the lure by means of a split circular ring 16.

Figure 2:
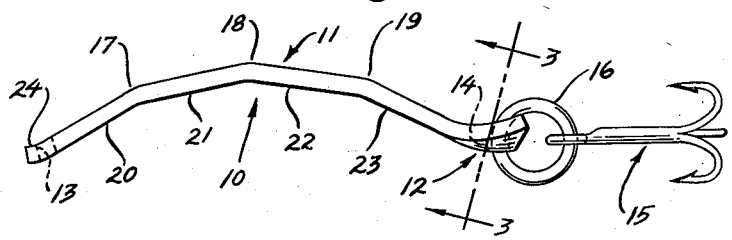
Fig. 2 is a plan view of the same.
Figure 3:
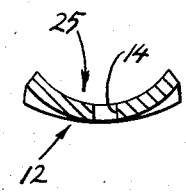
Fig. 3 is a cross-section view taken along the line 3—3 of Fig. 2.

Referring to Fig. 2, it will be seen that the body portion 11 is vertically bent at three places as indicated at 17, 18, 19, to form four planar sections 20, 21, 22, 23, at obtuse angles to each other whereby said body portion assumes generally an arcuate shape so that the lure will wobble when drawn through the water. In order to enhance the wobbling motion of the lure, it has been determined by experience that best results are attained when the forward end thereof is reversely bent slightly along the longitudinal axis of the lure, as indicated at 24. The tail portion 12 is concavely formed transversely to said longitudinal axis, as best illustrated in Fig. 3, and indicated at 25, said concavity being in the opposite direction with respect to the general longitudinal concavity of the body portion 11. It has been found by experimentation that such arcuate formation of the tail portion has a tendency to stabilize the lure, thereby limiting any tendency toward turning and spinning.

One advantage of the improved fish lure is that, in moving through the water, it exhibits erratic life-like motions simulating a live bait.

Another important advantage resides in the fact that the shiny flat planar surfaces of the lure, while wobbling through the water, reflect moving beams of light, which, because of the highly modulated nature of the reflected light facets as seen by the game fish, is very tantalizing thereto.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

A fishing lure of sheet material of greater length than width and concavo-convex longitudinally, said sheet material comprising central flat sections at an obtuse angle to each other and other flat sections external of said central sections, each of the other flat sections being at an obtuse angle to an adjacent central section, one of said other flat sections having at an end thereof a longitudinally curved apertured section and another of said other flat sections having at an end thereof a transversely curved apertured section, said apertured sections providing means for the attachment of said lure to a line and a hook.

ALBERT W. ROUND.

REFERENCES CITED

The following references are of record in the file of this patent:

UNITED STATES PATENTS

| Number | Name | Date |
|---|---|---|
| 1,846,130 | Martin | Feb. 23, 1932 |
| 2,214,409 | Eaby | Sept. 10, 1940 |
| 2,394,132 | Zeibig | Feb. 5, 1946 |
| 2,519,048 | Janisch | Aug. 15, 1950 |